(12) United States Patent
Hyodo et al.

(10) Patent No.: US 12,388,171 B2
(45) Date of Patent: Aug. 12, 2025

(54) VEHICLE UPPER STRUCTURE

(71) Applicant: TOYOTA JIDOSHA KABUSHIKI KAISHA, Aichi-ken (JP)

(72) Inventors: Hiroki Hyodo, Toyota (JP); Masaya Miura, Toyota (JP); Koichiro Ueno, Nagoya (JP); Shintaro Kitakata, Nissin (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 104 days.

(21) Appl. No.: 18/525,876

(22) Filed: Dec. 1, 2023

(65) Prior Publication Data
US 2024/0186689 A1   Jun. 6, 2024

(30) Foreign Application Priority Data
Dec. 5, 2022   (JP) .................................. 2022-194026

(51) Int. Cl.
*H01Q 1/32* (2006.01)
*B62D 25/06* (2006.01)

(52) U.S. Cl.
CPC ........... *H01Q 1/3275* (2013.01); *B62D 25/06* (2013.01)

(58) Field of Classification Search
CPC .......... H01Q 1/12; H01Q 1/3275; H01Q 1/32; H01Q 1/42; B62D 25/06
See application file for complete search history.

(56) References Cited

U.S. PATENT DOCUMENTS

| | | | |
|---|---|---|---|
| 9,966,659 B2 * | 5/2018 | Chakam | ................. H01Q 1/241 |
| 11,233,318 B2 * | 1/2022 | Imamura | ................. H01Q 1/48 |
| 12,136,761 B2 * | 11/2024 | Nishikido | ............ H01Q 1/3275 |

FOREIGN PATENT DOCUMENTS

| | | |
|---|---|---|
| EP | 2468544 A1 | 6/2012 |
| JP | H10316022 A | 12/1998 |
| JP | 2003133826 A | 5/2003 |
| JP | 2011136595 A | 7/2011 |
| JP | 2012131338 A | 7/2012 |
| JP | 2021-011191 A | 2/2021 |

* cited by examiner

*Primary Examiner* — Hasan Islam
(74) *Attorney, Agent, or Firm* — HAUPTMAN HAM, LLP

(57) ABSTRACT

A vehicle upper structure comprising: a roof panel having a communication opening and at least one bead; and a communication device fixed to the roof panel such that the communication device does not protrude beyond a design surface of the roof panel to an exterior of the vehicle, wherein the communication device is located within the communication opening in plan view, and the at least one bead is formed at a periphery of the communication opening.

4 Claims, 4 Drawing Sheets

VEHICLE UPPER STRUCTURE

CROSS REFERENCE TO RELATED APPLICATION

This application claims priority to Japanese Patent Application No. 2022-194026 filed on Dec. 5, 2022, which is incorporated herein by reference in its entirety including the specification, claims, drawings, and abstract.

TECHNICAL FIELD

This specification discloses a vehicle upper structure.

BACKGROUND

In the past, it has been proposed to place a communication devices such as antennas on a roof of a vehicle. For example, Patent Document 1 discloses a structure for mounting an antenna on the roof. In Document 1, an upper part of the antenna is located above the roof (i.e., exterior of the vehicle), and a lower part of the antenna is located below the roof (i.e., interior of the vehicle). The roof has a hole through which this antenna passes. Also disclosed in Document 1 is the formation of an elongated bead in the front-back direction on the roof arch that partially overlaps the roof panel.

By the way, in the structure described in Patent Document 1, the antenna protrudes from the roof to the exterior of the vehicle. Recently, however, it has been proposed by some to place such the communication device inside the vehicle. In this case, communication opening is formed in the roof panel to expose the communication device to the exterior of the vehicle in order to ensure radio wave permeability. The communication opening is then covered with a resin cover.

When communication openings are formed, the rigidity of the roof panel naturally decreases around the communication openings. As a result, there is a risk of deformation or folding of the roof panel around the communication opening. In other words, it has conventionally been difficult to suppress deformation of the roof panel while forming communication openings in the roof panel.

Therefore, this specification discloses the vehicle upper structure that can suppress deformation of the roof panel while forming the communication opening in the roof panel.

CITATION LIST

PATENT DOCUMENT 1: JP2021-011191 A

SUMMARY

The vehicle upper structure disclosed herein comprises a roof panel having a communication opening and at least one bead; and a communication device fixed to the roof panel such that the communication device does not protrude beyond a design surface of the roof panel to an exterior of the vehicle, wherein the communication device is located within the communication opening in plan view, and the at least one bead is formed at a periphery of the communication opening.

Such a configuration can improve the rigidity of the roof panel in the vicinity of the communication opening, thereby reducing deformation of the roof panel.

In this case, the communication opening may be elongated in a vehicle width direction, the at least one bead may be aligned with the communication opening in the vehicle width direction, and each of the at least one bead may not protrude beyond the design surface of the roof panel to the exterior of the vehicle.

Such a configuration effectively prevents the roof panel from folding along the long axis of the communication opening.

A dimension in the vehicle width direction of the communication opening may be ½ or more of a dimension in the vehicle width direction of the roof panel, the roof panel further comprises a recessed portion may adjacent to the communication opening in the vehicle width direction and recessed into the interior of the vehicle from the design surface of the roof panel, and each of the at least one bead may be a convex bead protruding from the recessed portion.

The recessed portions can further improve the rigidity of the roof panel in the vicinity of the communication openings. In addition, by placing the convex bead in the recessed portion, the top height of the convex bead can be kept low and interference between said convex bead and the resin cover can be prevented.

Each of the at least one bead may extend in a front-rear direction of the vehicle.

Such a configuration can prevent the roof panel from folding along a line extending in the vehicle width direction in the vicinity of the communication opening.

The vehicle upper structure may further include a roof reinforcement joined to a lower surface of the roof panel near a front edge of the communication opening and forming a closed cross section elongated in the vehicle width direction between the roof reinforcement and the roof panel; and a rear header joined to a lower surface of the roof panel near a rear edge of the communication opening and forming a closed cross section elongated in the vehicle width direction between the rear header and the roof panel.

Such a configuration can more effectively prevent deformation and folding of the roof panel in the vicinity of the communication opening.

According to the technology disclosed herein, the rigidity of the roof panel around the communication opening can be improved, thereby preventing deformation of the roof panel.

BRIEF DESCRIPTION OF DRAWINGS

Embodiment(s) of the present disclosure will be described based on the following figures, wherein.

EMBODIMENTS

Figure 1:
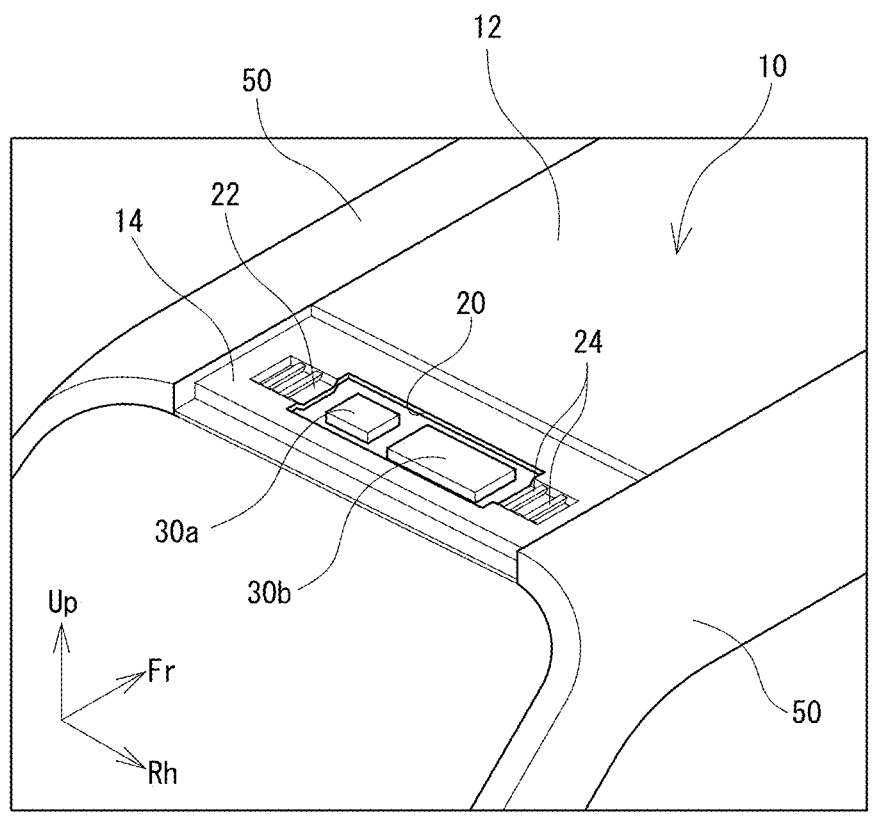
FIG. 1 is a perspective view of the upper part of the vehicle.
Figure 2:
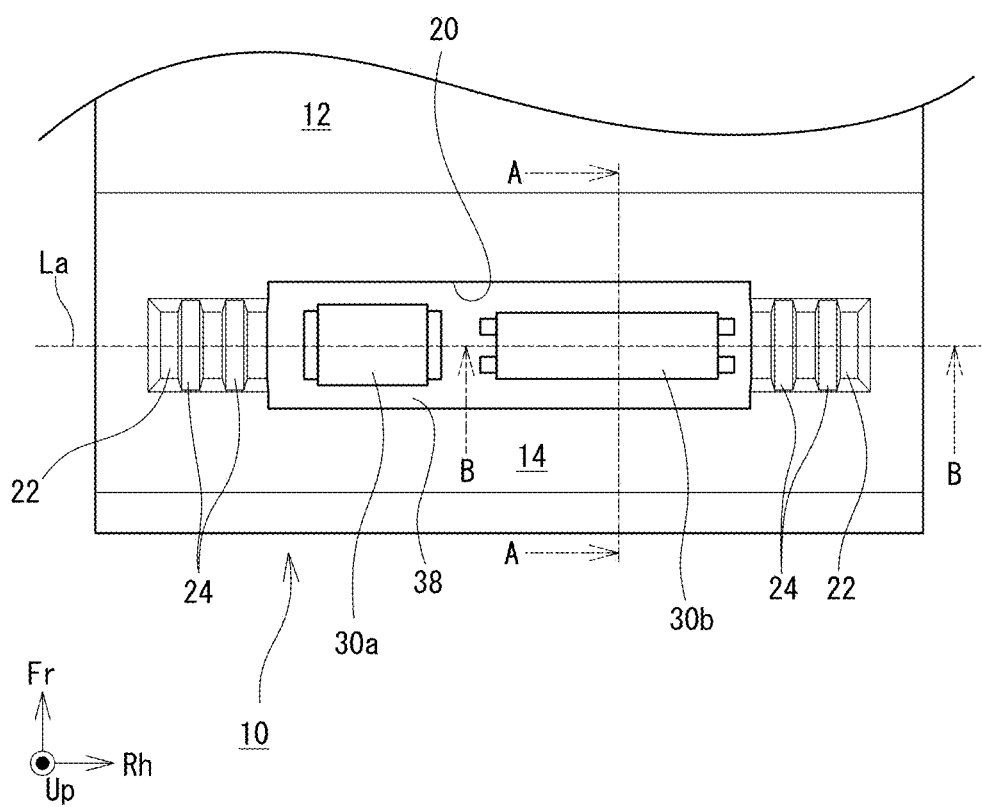
FIG. 2 is a plan view of the periphery of the communication device.
Figure 3:
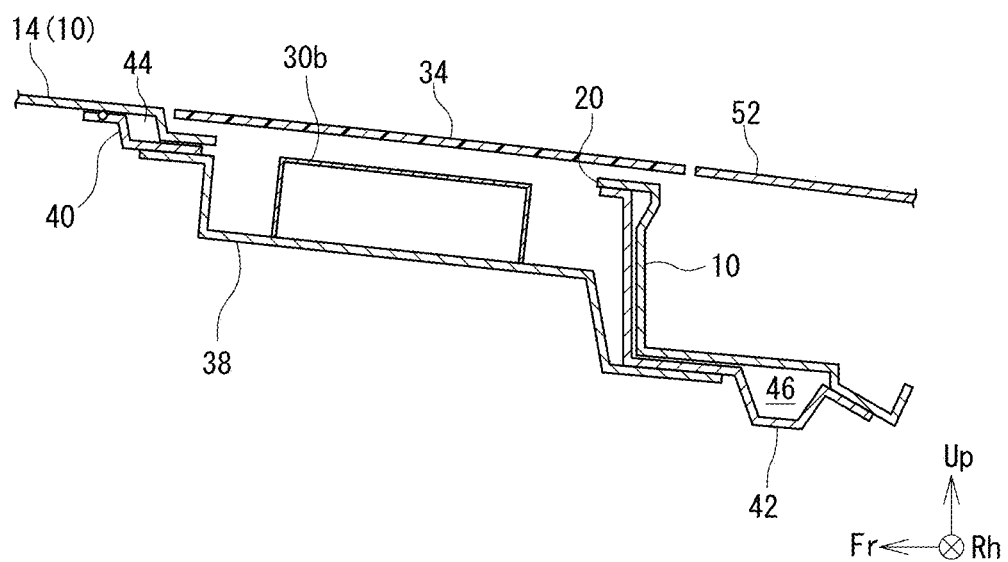
FIG. 3 is an A-A cross-sectional view in FIG. 2.
Figure 4:
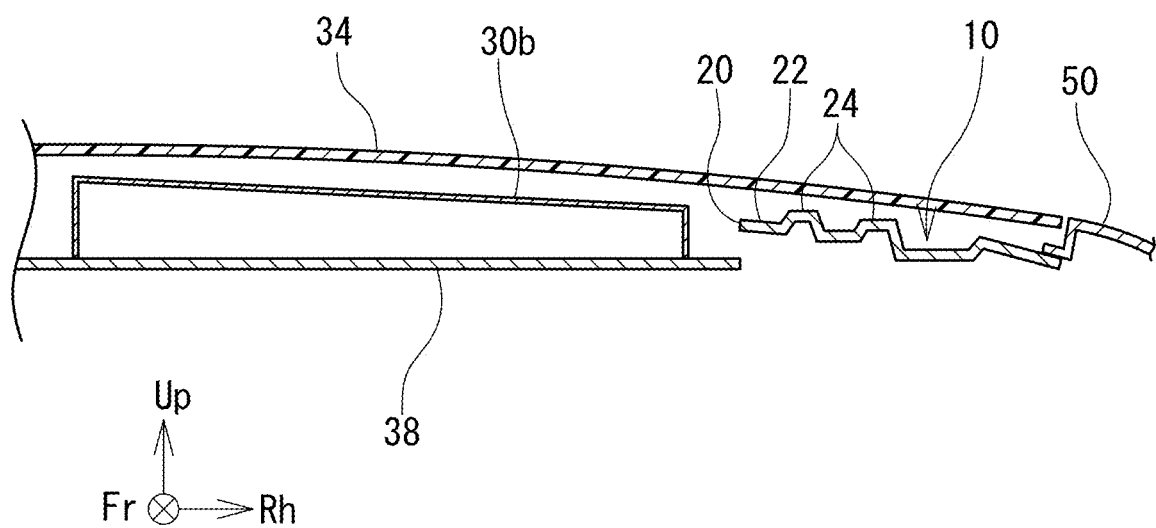
FIG. 4 is a B-B cross-sectional view in FIG. 2.

The vehicle upper structure is described below with reference to the drawings. FIG. 1 is a perspective view of the top of the vehicle. FIG. 2 is a plan view of the periphery of the communication device 30. FIG. 3 is an A-A cross-sectional view of FIG. 2, and FIG. 4 is a B-B cross-sectional view of FIG. 2. In FIG. 1 through FIG. 4, some components that are not necessary for the explanation are omitted. For example, in FIG. 1 and FIG. 2, a resin cover 34 is omitted from the illustration. Also, in FIG. 1 through FIG. 4, the rear panel 52, or the side member outer panel 50, or both, are omitted. In each FIG., "Up," "Fr," and "Rh" refer to the information, front, and right side of the vehicle, respectively.

As shown in FIG. 1, a roof panel 10 is located at an upper portion of the vehicle. Side member outer panels 50 are connected to the left and right sides of the roof panel 10. The side member outer panel 50 is a panel material that constitutes the outer surface of the vehicle.

The roof panel 10 is a panel material forming the upper surface of the vehicle and is usually made of steel or other metal. The roof panel 10 includes a a design surface 12 and a placement surface 14. The design surface 12 is the outer surface of the roof panel 10 that is exposed to the exterior of the vehicle. The design surface 12 occupies the majority of the roof panel 10. The placement surface 14 is a surface that is slightly recessed below the design surface 12. The placement surface 14 is located at the rear end of the roof panel 10. The placement surface 14 is covered by a resin cover 34 (not shown in FIG. 1), which is described below.

The placement surface 14 has a communication opening 20, a recessed portion 22, and a plurality of beads 24. The communication opening 20 is an elongated, rectangular opening in the vehicle width direction. For example, the dimension in the vehicle width direction of the communication opening 20 is at least ½ of the dimension in the vehicle width direction of the roof panel 10. The communication opening 20 is formed to allow good passage of radio waves. A communication module 30a and an antenna 30b, which will be described later, are located inside the communication opening 20 in plan view.

The recessed portion 22 is formed on both sides of the communication opening 20, one on each side of the vehicle width direction, for a total of two recessed portions. The recessed portion 22 is a portion recessed further inward (i.e., downward) from the placement surface 14. The recessed portion 22 is connected to the vehicle width direction end of the communication opening 20. The recessed portion 22 is rectangular in plan view. The front-to-rear dimension of the recessed portion 22 is smaller than the front-to-rear dimension of the communication opening 20.

Bead 24 is a convex bead protruding from recessed portion 22. In this example, two beads 24 are located in one recessed portion 22. However, the number of beads 24 is not limited and may be one or more than two. The beads 24 extend in the front-rear direction of the vehicle. The top surface of bead 24 is lower than the placement surface 14. In other words, the bead 24 does not project beyond the design surface 12 of the roof panel 10 to the exterior of the vehicle. The reason for forming such bead 24 will be explained later. The bead 24 is large enough to fit completely inside the recessed portion 22. In other words, bead 24 does not protrude outward in the front to back direction beyond communication opening 20.

The communication module 30a and antenna 30b are fixed to the roof panel 10 so that they do not protrude beyond the exterior of the vehicle beyond the design surface 12 of the roof panel 10. The antenna 30b transmits and receives radio waves for data communication. In the example disclosed herein, the antenna 30b is flat or box-shaped. The communication module 30a is a device that sends and receives data to and from other communication devices. The communication module 30a controls the transmission and reception of radio waves through the antenna 30b. In the following, when the communication module 30a and antenna 30b are not distinguished, they are referred to as "communication device 30."

Both communication module 30a and antenna 30b are located inside communication opening 20 in plan view. In other words, the communication module 30a and antenna 30b are not covered by the roof panel 10, which is made of steel. When the resin cover 34 is removed, both the communication module 30a and the antenna 30b are exposed to the outside. With such a configuration, radio waves for communication are not shielded by the roof panel 10, so that radio waves are transmitted and received well.

The communication module 30a and antenna 30b are attached to the antenna plate 38 (FIGS. 3 and 4) by bolts or other fastening members (not shown). Antenna plate 38 is a plate material that supports communication module 30a and antenna 30b. The antenna plate 38 is fastened to the roof reinforcement 40 (hereinafter referred to as "roof RF40") and rear header 42, which are described later, by bolts and other fastening members. In other words, the antenna plate 38 and the communication device 30 are fixed to the roof panel 10.

The roof RF 40 is a panel material that is joined to the lower surface of the roof panel 10 to reinforce the roof panel 10, as shown in FIG. 3. The roof RF 40 is located near the front edge of the communication opening 20. The roof RF 40 is adhered to the roof panel 10 by welding or other means. The cross-sectional shape of the roof RF 40 has an abbreviated L-shaped cross-sectional shape. The roof RF 40 and the roof panel 10 constitutes form an elongated closed cross section 44 in the vehicle width direction.

Rear header 42 is also a panel material that is joined to the lower surface of roof panel 10 to reinforce roof panel 10. The rear header 42 is located near the rear edge of the communication opening 20. The rear header 42 is adhered to the roof panel 10 by welding or other means. The rear header 42 has an elongated channel shape in the vehicle width direction. By having such a channel shape, an elongated closed cross section 46 in the vehicle width direction formed between the rear header 42 and the roof panel 10.

The resin cover 34 covers the entire placement surface 14 from above. In other words, the resin cover 34 covers the entire bead 24 and the communication device 30 from above. Therefore, neither the bead 24 nor the communication device 30 is visible from the exterior of the vehicle. The protrusion of bead 24 is large enough not to contact this resin cover 34.

The resin cover 34 is made of a radio wave transmitting resin, for example, a general purpose resin such as polypropylene or polycarbonate/polyester. The resin cover 34 is fixed to the roof panel 10, for example by adhesion. Naturally, the resin cover 34 may be secured to the roof panel 10 by bolts, clips, or other fastening members. In this case, a sealing member may be placed around the periphery of the resin cover 34. The top surface of the resin cover 34 is smoothly continuous with the design surface 12 of the roof panel 10.

As is clear from the above description, the vehicle upper structure disclosed herein has a bead 24 at the periphery of the communication opening 20. The reason for such a configuration will be explained. For the purpose of improving communication performance, the size of in-vehicle communication devices 30 (e.g., antennas 30b, etc.) has recently been increasing. As a result, the size of the communication openings 20 for transmitting radio waves has also increased. When large communication openings 20 are formed in the roof panel 10, the rigidity of the roof panel 10 naturally decreases at the periphery of the communication openings 20. As a result, deformation or folding of the roof panel 10 may occur at the periphery of the communication opening 20. In particular, when the communication opening 20 is elongated in the vehicle width direction, as shown in FIGS. 1 and 2, the roof panel 10 may fold along the long axis La of the communication opening 20 (see FIG. 2).

Placing the bead 24 at the periphery of the communication opening 20 increases the stiffness of the roof panel 10 at the periphery of the communication opening 20. As a result, folding and deformation of the roof panel 10 can be effectively prevented. As mentioned above, the bead 24 extends in the front-rear direction of the vehicle, in other words, in a direction orthogonal to the elongated direction of the communication opening 20. In this case, folding along the long axis La of the communication opening 20 is effectively prevented.

Further, as described above, recessed portions 22 are formed on both sides of the communication opening 20 in the vehicle width direction. By forming such recessed portions 22 and increasing the unevenness at the periphery of the communication opening 20, the rigidity of the roof panel 10 at said periphery can be further improved. Also, the bead 24 is erected from the recessed portion 22. This provides a convex bead 24 of sufficient height while preventing interference between the bead 24 and the resin cover 34.

The roof RF 40 and rear header 42 are located in front of and behind the communication opening 20. This forms a closed cross section 44, 46, elongated in the vehicle width direction, in front of and behind the communication opening 20. Forming such closed cross sections 44, 46 increases the rigidity of the roof panel 10 around the front edge and around the rear edge of the communication opening 20. As a result, deformation and folding of the roof panel 10 can be more reliably prevented.

The configurations described so far are all examples. Thus, the vehicle upper structure may be modified in other ways, provided that the communication device 30 is located inside the communication opening 20 in plan view and at least one bead 24 is formed at the periphery of the communication opening 20. For example, the number, shape, and location of the beads 24 may be modified accordingly. Thus, for example, bead 24 may be a concave bead protruding downward instead of a convex bead protruding upward. The recessed portion 22 may be omitted if interference between the bead 24 and the resin cover 34 can be prevented.

REFERENCE SIGNS LIST 10 roof panel, 12 design surface, 14 placement surface, 20 communication opening, 22 recessed portion, 24 bead, 30 communication device, 30a communication module, 30b antenna, 34 resin cover, 38 antenna plate, 40 roof reinforcement, 42 rear header, 44 closed cross section, 46 closed cross section, 50 side member outer panel, 52 rear panel.

The invention claimed is:

1. A vehicle upper structure, comprising:
a roof panel having a communication opening and at least one bead; and
a communication device fixed to the roof panel such that the communication device does not protrude beyond a design surface of the roof panel to an exterior of a vehicle, wherein
the communication device is located within the communication opening in a plan view,
the at least one bead is formed at a periphery of the communication opening,
the communication opening is elongated in a vehicle width direction,
the at least one bead is aligned with the communication opening in the vehicle width direction, and
each of the at least one bead does not protrude beyond the design surface of the roof panel to the exterior of the vehicle.

2. A vehicle upper structure, comprising:
a roof panel having a communication opening and at least one bead; and
a communication device fixed to the roof panel such that the communication device does not protrude beyond a design surface of the roof panel to an exterior of a vehicle, wherein
the communication device is located within the communication opening in a plan view,
the at least one bead is formed at a periphery of the communication opening,
a dimension in a vehicle width direction of the communication opening is ½ or more of a dimension in the vehicle width direction of the roof panel,
the roof panel further comprises a recessed portion adjacent to the communication opening in the vehicle width direction and recessed into an interior of the vehicle from the design surface of the roof panel, and
each of the at least one bead is a convex bead protruding from the recessed portion.

3. A vehicle upper structure, comprising:
a roof panel having a communication opening and at least one bead; and
a communication device fixed to the roof panel such that the communication device does not protrude beyond a design surface of the roof panel to an exterior of a vehicle, wherein
the communication device is located within the communication opening in a plan view,
the at least one bead is formed at a periphery of the communication opening, and
each of the at least one bead extends in a front-rear direction of the vehicle.

4. The vehicle upper structure according to claim 1, further comprising:
a roof reinforcement joined to a lower surface of the roof panel near a front edge of the communication opening and forming a closed cross section elongated in the vehicle width direction between the roof reinforcement and the roof panel; and
a rear header joined to a lower surface of the roof panel near a rear edge of the communication opening and forming a closed cross section elongated in the vehicle width direction between the rear header and the roof panel.

* * * * *